United States Patent
Ho et al.

(10) Patent No.: US 8,189,439 B2
(45) Date of Patent: May 29, 2012

(54) DATA RECORDING METHOD AND APPARATUS FOR RE-VERIFYING CORRECTNESS OF RECORDED DATA ON OPTICAL STORAGE MEDIUM

(75) Inventors: Sheng-Yen Ho, Tainan (TW); Po-Ching Lu, Taichung (TW); Hsuan-Han Huang, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 88 days.

(21) Appl. No.: 12/837,509

(22) Filed: Jul. 16, 2010

(65) Prior Publication Data

US 2012/0014234 A1  Jan. 19, 2012

(51) Int. Cl.
*G11B 7/00* (2006.01)
(52) U.S. Cl. .................................. 369/53.1
(58) Field of Classification Search ........ 369/44.32, 369/53.12, 53.15, 53.17, 53.21, 275.3, 53.42, 369/53.1
See application file for complete search history.

(56) References Cited

U.S. PATENT DOCUMENTS

| | | | |
|---|---|---|---|
| 5,700,096 A * | 12/1997 | Satoh et al. | 400/225 |
| 6,983,292 B1 * | 1/2006 | Green et al. | 1/1 |
| 7,539,100 B2 * | 5/2009 | Kim et al. | 369/53.17 |
| 2006/0158976 A1 * | 7/2006 | Fukunaga et al. | 369/44.34 |
| 2010/0302919 A1 * | 12/2010 | Ling et al. | 369/30.23 |

* cited by examiner

*Primary Examiner* — Nabil Hindi
(74) *Attorney, Agent, or Firm* — Winston Hsu; Scott Margo

(57) ABSTRACT

An exemplary data recording method of an optical storage medium includes following steps: during a current recording operation for recording first data onto the optical storage medium, detecting if a fatal recording error occurs; and when the fatal recording error is detected, activating a current verifying operation to verify correctness of a recorded data section on the optical storage medium. The recorded data section is recorded onto the optical storage medium according to second data during a previous recording operation, and data recording of the second data has been verified during a previous verifying operation prior to the current recording operation.

18 Claims, 13 Drawing Sheets

DATA RECORDING METHOD AND APPARATUS FOR RE-VERIFYING CORRECTNESS OF RECORDED DATA ON OPTICAL STORAGE MEDIUM

BACKGROUND

The present invention is related to recording data onto an optical storage medium, and more particularly, to a data recording method and apparatus with buffer management capability for re-verifying recorded data on an optical storage medium (e.g., an optical disc).

In general, when an optical storage apparatus, such as an optical disc drive, accomplishes writing a portion of user data onto a storage medium, such as an optical disc, the optical storage apparatus will verify the correctness of the recorded portion of user data, recorded onto the storage medium in the latest recording operation, according to the portion of user data which is still buffered in a buffer. In other words, a plurality of recording operations and a plurality of corresponding verifying operations are involved in one recording procedure of the optical storage medium. Assume that the portion of user data includes a plurality of ECC blocks. When a specific ECC block recorded on the optical storage medium is verified to be defective, a conventional defective block management is enabled to find a spare block on the optical storage medium for storing the specific ECC block. After the verifying operation of the portion of user data is completed, another portion of user data is received and then overwrites the portion of user data originally buffered in the buffer, and the optical storage apparatus starts a next recording operation for new data buffered in the buffer.

However, an optical pick-up head of the optical storage apparatus may slip to an erroneous address on the optical storage medium when performing a recording operation. In other words, a fatal recording error may occur during the recording operation. For example, due to power transient from read power to write power and/or servo condition variation, the optical pick-up head may slip to an erroneous address in the beginning of one recording operation. In addition, after the optical pick-up head starts the recording operation, the optical pick-up head may slip to an erroneous address due to insufficient control of a sled on which the optical pick-up head is disposed. Moreover, regarding a DVDRAM disc with wobbled land and groove tracks used for recording data, the optical pick-up head may slip to an erroneous address at a switching point between a land track and a groove track. As the fatal recording error is detected only when the optical pick-up head has slipped to an erroneous address, the write power of the optical pick-up head may damage data recorded on the optical storage medium, which degrades the data recording quality.

Please refer to FIG. 1A and FIG. 1B, which are diagrams illustrating conventional operations of verifying recorded data on an optical disc and recording data onto the optical disc, respectively. Assume that data units for data storage on the optical disc are ECC blocks, and six ECC blocks are recorded in one recording operation. As shown in FIG. 1A, ECC blocks (N−6), . . . , (N−1) are recorded onto the optical disc in one recording operation, where ECC blocks (N−6), . . . , (N−2) recorded on the optical disc have been verified in order, and the ECC block (N−1) recorded on the optical disc is under verification now. Therefore, as the recorded ECC blocks (N−6), . . . , (N−2) on the optical disc have been verified, ECC blocks (N−2), . . . , (N−6) originally buffered in the buffer are overwritten by ECC blocks N, . . . , (N+4) to be recorded onto the optical disc in the next recording operation. After the correctness of the recorded ECC block (N−1) on the optical disc has been verified, the ECC block (N−1) in the buffer is overwritten by an ECC block (N+5) to be recorded onto the optical disc in the next recording operation. As shown in FIG. 1B, the buffer stores ECC blocks N, . . . , (N+5) after the verifying operation of recorded ECC blocks (N−6), . . . , (N−1) is completed. Next, the optical disc drive starts a new recording operation to record buffered ECC blocks N, . . . , (N+5) in the buffer onto the optical disc. Assume that the optical pick-up head slips to an erroneous address at a recording start point of recording the ECC block N onto the optical disc. As can be seen from FIG. 1B, the optical pick-up head moves backwards to an address where a previously recorded and verified ECC block (N−2) is located, and the laser beam emitted by the optical pick-up head may damage the data content of the recorded ECC block (N−2). As the buffer only stores ECC blocks N, . . . , (N+5), the defective ECC block N can be successfully detected during a verifying operation, but the verifying operation fails to identify the damaged ECC block (N−2) which has been verified during a previous verifying operation. As a result, no defective block management will be applied to the damaged ECC block (N−2), and the correct data content of the ECC block (N−2) cannot be reproduced from the optical disc.

SUMMARY

In accordance with embodiments of the present invention, data recording methods and apparatuses with buffer management capability for re-verifying recorded data on an optical storage medium (e.g., an optical disc) are proposed to solve the problems mentioned above.

According to a first aspect of the present invention, an exemplary data recording method of an optical storage medium is disclosed. The exemplary data recording method includes following steps: during a current recording operation for recording first data onto the optical storage medium, detecting if a fatal recording error occurs; and when the fatal recording error is detected, activating a current verifying operation to verify correctness of a recorded data section on the optical storage medium. The recorded data section was recorded onto the optical storage medium according to second data during a previous recording operation, and data recording of the second data has been verified during a previous verifying operation prior to the current recording operation.

According to a second aspect of the present invention, an exemplary data recording apparatus of an optical storage medium is disclosed. The exemplary data recording apparatus includes: a recording circuit, configured for recording data onto the optical storage medium; a detecting circuit, configured for detecting if a fatal recording error occurs during a current recording operation performed by the recording circuit to record first data onto the optical storage medium; and a verifying circuit, coupled to the detecting circuit, for performing a current verifying operation to verify correctness of a recorded data section on the optical storage medium when the fatal recording error is detected by the detecting circuit. The recorded data section was recorded onto the optical storage medium according to second data during a previous recording operation performed by the recording circuit, and data recording of the second data has been verified during a previous verifying operation performed by the verifying circuit prior to the current recording operation performed by the recording circuit.

According to a third aspect of the present invention, an exemplary data recording method of an optical storage medium is disclosed. The exemplary data recording method includes: referring to second data buffered in a buffer to record the second data onto the optical storage medium during a previous recording operation; and receiving a portion of first data and replacing a portion of the second data buffered in the buffer with the portion of the first data. The buffer has a remaining portion of the second data and the portion of the first data buffered therein in a beginning of a current recording operation utilized for recording the first data onto the optical storage medium.

According to a fourth aspect of the present invention, an exemplary data recording apparatus of an optical storage medium is disclosed. The exemplary data recording apparatus includes: a buffer; a recording circuit, coupled to the buffer, for referring to second data buffered in a buffer to record the second data onto the optical storage medium during a previous recording operation; and a buffer controller, coupled to the buffer, for receiving a portion of first data and replacing a portion of the second data buffered in the buffer with the portion of the first data. The buffer has a remaining portion of the second data and the portion of the first data buffered therein in a beginning of a current recording operation performed by the recording circuit to record the first data onto the optical storage medium.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to re-verify recorded data on an optical storage medium (e.g., an optical disc) when a fatal recording error occurs. By way of example, but not limitation, re-verifying recorded data on the optical storage medium is achieved by properly managing buffered data in a buffer. More specifically, after the correctness of data recorded onto the optical storage medium in one recording operation has been verified, only part of the data in the buffer are overwritten by new data to be recorded onto the optical storage medium in the next recording operation. In this way, when a fatal recording error occurs due to the optical pick-up head slipping to an erroneous address where recorded data are located, the recorded data damaged due to the laser beam emitted by the optical pick-up head may be detected through remaining data which are used in the previous recording operation and still maintained in the buffer. In this way, as the damaged data can be successfully detected, a spare area reserved on the optical storage medium can be used to record correct data, thereby solving the problem caused by the optical pick-up head slipping to an erroneous address during a recording operation. Details of the present invention are described in the following.

Figure 1A:
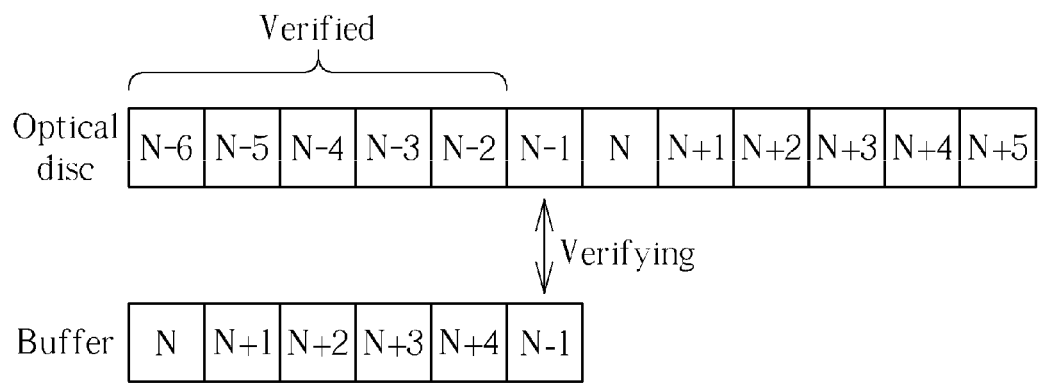
FIG. 1A is a diagram illustrating a conventional operation of verifying recorded data on an optical disc.
Figure 1B:
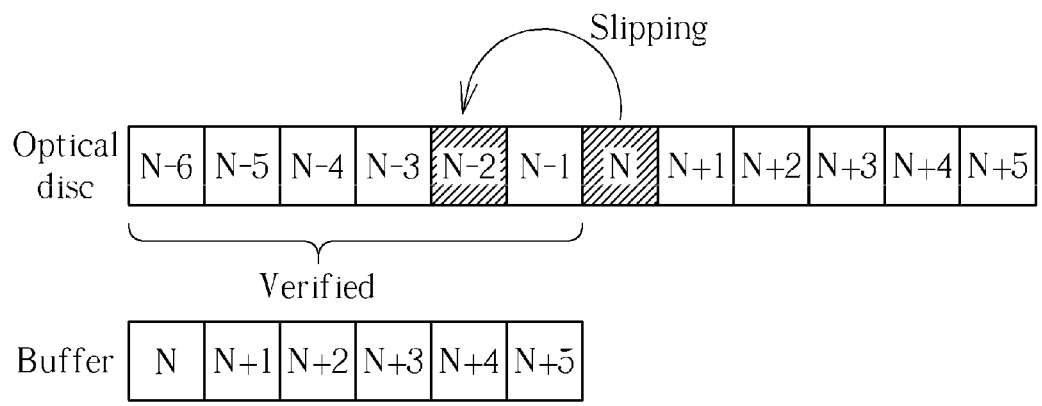
FIG. 1B is a diagram illustrating a conventional operation of recording data onto the optical disc.
Figure 2:
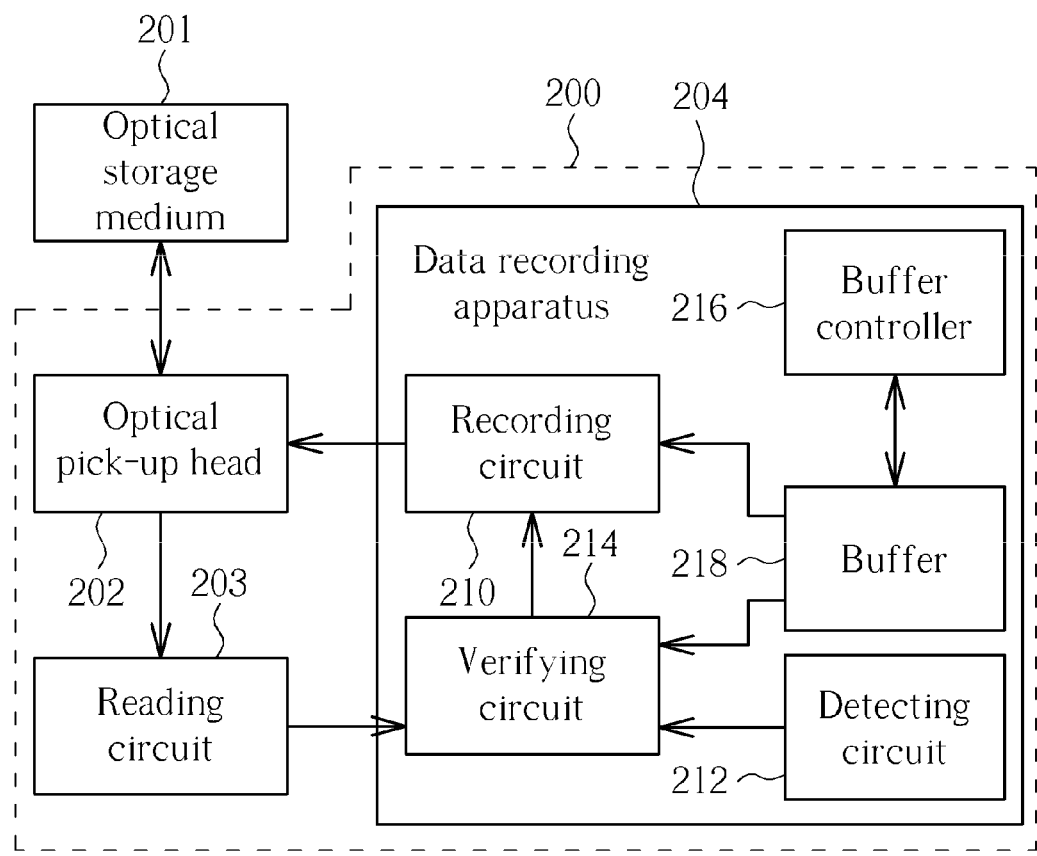
FIG. 2 is a block diagram illustrating a data recording apparatus of an optical storage medium according to an exemplary embodiment of the present invention.

FIG. 2 is a block diagram illustrating a data recording apparatus of an optical storage medium according to an exemplary embodiment of the present invention. The exemplary data recording apparatus 204 includes, but is not limited to, a recording circuit 210, a detecting circuit 212, a verifying circuit 214, a buffer controller 216, and a buffer 218. In one exemplary implementation, the data recording apparatus 204, an optical pick-up head 202 and a reading circuit 203 are all disposed in an optical storage apparatus 200, where the optical pick-up head 202 is arranged to emit a laser beam and detect a reflected laser beam for recording data onto and reading data from an optical storage medium 201, the reading circuit 203 is arranged to control the optical pick-up head 202 to read recorded data from the optical storage medium 201, and the recording circuit 210 included in the data recording apparatus 204 is arranged to control the optical pick-up head 202 to record data onto the optical storage medium 201. By way of example, but not limitation, the optical storage medium 201 is an optical disc, and the optical storage apparatus 200 is an optical disc drive.

Regarding other elements included in the exemplary data recording apparatus 204, the detecting circuit 212 is for detecting if a fatal recording error occurs during a current recording operation performed by the recording circuit 210 to record first data onto the optical storage medium 201; and the verifying circuit 214 is coupled to the reading circuit 203 and the detecting circuit 212, and utilized for performing a verifying operation to currently verify correctness of a recorded data section on the optical storage medium 201 when the fatal recording error is detected by the detecting circuit 212. The verifying circuit 214 may inform the recording circuit 210 of the verification result. For example, when informed by the verifying circuit 214, the recording circuit 210 may use a defective data management scheme for storing buffered data, corresponding to the recorded data damaged due to the fatal recording error, onto a spare area of the optical storage medium 201. However, this is for illustrative purposes only. That is, the verification result generated from the verifying circuit 214 may be provided to any circuit element which needs the information of the defective data on the optical storage medium 201. Please note that the aforementioned first data are recorded during the current recording operation, and a recording operation of second data occurs before the current recording operation. Therefore, regarding the above-mentioned recorded data section, it was recorded onto the optical storage medium 201 according to the second data during the previous recording operation performed by the recording circuit 210, and data recording of the second data has been verified during a previous verifying operation performed by the verifying circuit 214 prior to the current recording operation performed by the recording circuit 210. In other words, the exemplary data recording apparatus 204 has the capability of re-verifying recorded data on the optical storage medium 201.

To achieve the objective of re-verifying recorded data on the optical storage medium 201, the exemplary data recording apparatus 204 of the present invention employs the buffer controller 216 to apply buffer management upon the buffer (e.g., a write buffer) 218. However, this is for illustrative purposes only, and is not meant to be a limitation to the present invention. As long as the same objective of re-verifying recorded data on the optical storage medium 201 is achieved, any feasible means can be employed by the data recording apparatus 204.

In this exemplary embodiment, the buffer 218 is coupled to the recording circuit 210, the verifying circuit 214, and the buffer controller 216. Therefore, the recording circuit 210 refers to the second data buffered in the buffer 218 to record the second data onto the optical storage medium 201 during the previous recording operation. The buffer controller 216 receives a portion of the first data and replaces a portion of the second data buffered in the buffer 218 with the portion of the first data such that the buffer 218 has a remaining portion of the second data and the portion of the first data buffered therein in the beginning of the current recording operation performed by the recording circuit 210. As the second data which have been used in the previous recording operation are not completely overwritten by new incoming data after the previous verifying operation is accomplished, re-verifying recorded data on the optical storage medium 201 can be easily realized when a fatal recording error is found in the current recording operation used for recording the first data.

With the buffer management employed to control data buffering and data overwriting in the buffer 218, the buffer 218 will keep the remaining portion of the second data in the beginning of the current recording operation. For example, during the previous verifying operation performed by the verifying circuit 214, the buffer controller 216 releases a buffer space occupied by the portion of the second data, receives the portion of the first data, and stores the portion of the first data into the released buffer space of the buffer 218 to thereby overwrite the portion of the second data. During the current recording operation performed by the recording circuit 210, the buffer controller 216 releases at least part of the remaining portion of the second data available in the buffer 218, receives another portion of the first data, and stores the another portion of the first data into the released buffer space of the buffer to thereby overwrite at least part of the remaining portion of the second data.

Moreover, assume that at least part of the remaining portion of the second data is still available in the buffer 218 when the fatal recording error of the current recording operation is detected by the detecting circuit 212, the verifying circuit 214 will refer to at least part of the remaining portion of the second data available in the buffer 218 to verify correctness of a recorded data section on the optical storage medium 201. In addition, during the current verifying operation performed by the verifying circuit 214, the buffer controller 216 will release a buffer space occupied by at least part of the remaining portion of the second data available in the buffer 218, receives another portion of the first data, and stores the another portion of the first data into the released buffer space of the buffer 218 to overwrite at least part of the remaining portion of the second data.

Figure 3:
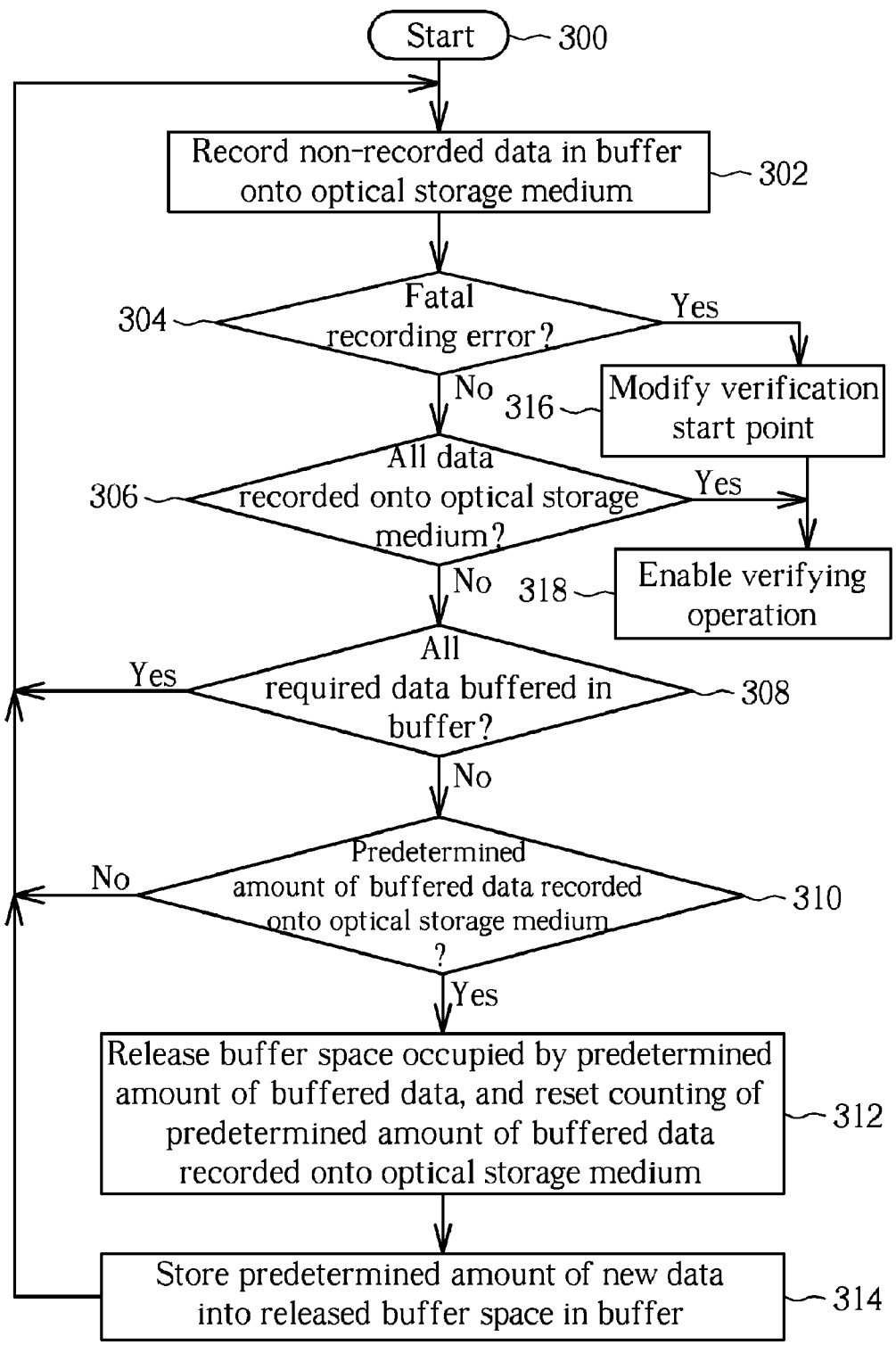
FIG. 3 is a flowchart illustrating an exemplary method of recording data onto an optical storage medium according to the present invention.

FIG. 3 is a flowchart illustrating an exemplary method of recording data onto an optical storage medium according to the present invention. Provided that the result is substantially the same, the steps are not required to be executed in the exact order shown in FIG. 3. The exemplary method may be employed by the data recording apparatus 204 shown in FIG. 2, and includes the following steps:

Step 300: Start a current recording operation according to a recording start point.

Step 302: The recording circuit 210 controls the optical pick-up head 202 to record non-recorded data (e.g., non-recorded ECC blocks or clusters) buffered in the buffer 218 onto the optical storage medium 201.

Step 304: The detecting circuit 212 checks if a fatal recording error occurs. If yes, the flow goes to step 316; otherwise, the flow goes to step 306.

Step 306: Have the recording circuit 210 recorded all of the data to be recorded in the current recording operation onto the optical storage medium 201? If yes, the flow goes to step 318; otherwise, the flow goes to step 308.

Step 308: The buffer controller 216 checks if all of the data to be recorded in the current recording operation have been buffered in the buffer. If yes, the flow goes to step 302; otherwise, the flow goes to step 310.

Step 310: The buffer controller 216 checks if a predetermined amount of buffered data (e.g., two ECC blocks or clusters) buffered in the buffer 218 has been recorded onto the optical storage medium. If yes, the flow goes to step 312; otherwise, the flow goes to step 302.

Step 312: The buffer controller 216 controls the buffer 218 to release a buffer space occupied by the predetermined amount of buffered data, and resets the counting of a predetermined amount of buffered data.

Step 314: The buffer controller 216 receives a predetermined amount of new data, and stores the predetermined amount of new data into the released buffer space of the buffer 218. The flow goes to step 302.

Step 316: The verifying circuit 214 modifies a verification start point to a beginning of data which were used by the recording circuit 210 in the previous recording operation and are still available in the buffer 218 now.

Step 318: The verifying circuit 214 is enabled to perform a verifying operation upon recorded data on the optical storage medium 201 according to the verification start point.

Figure 4:
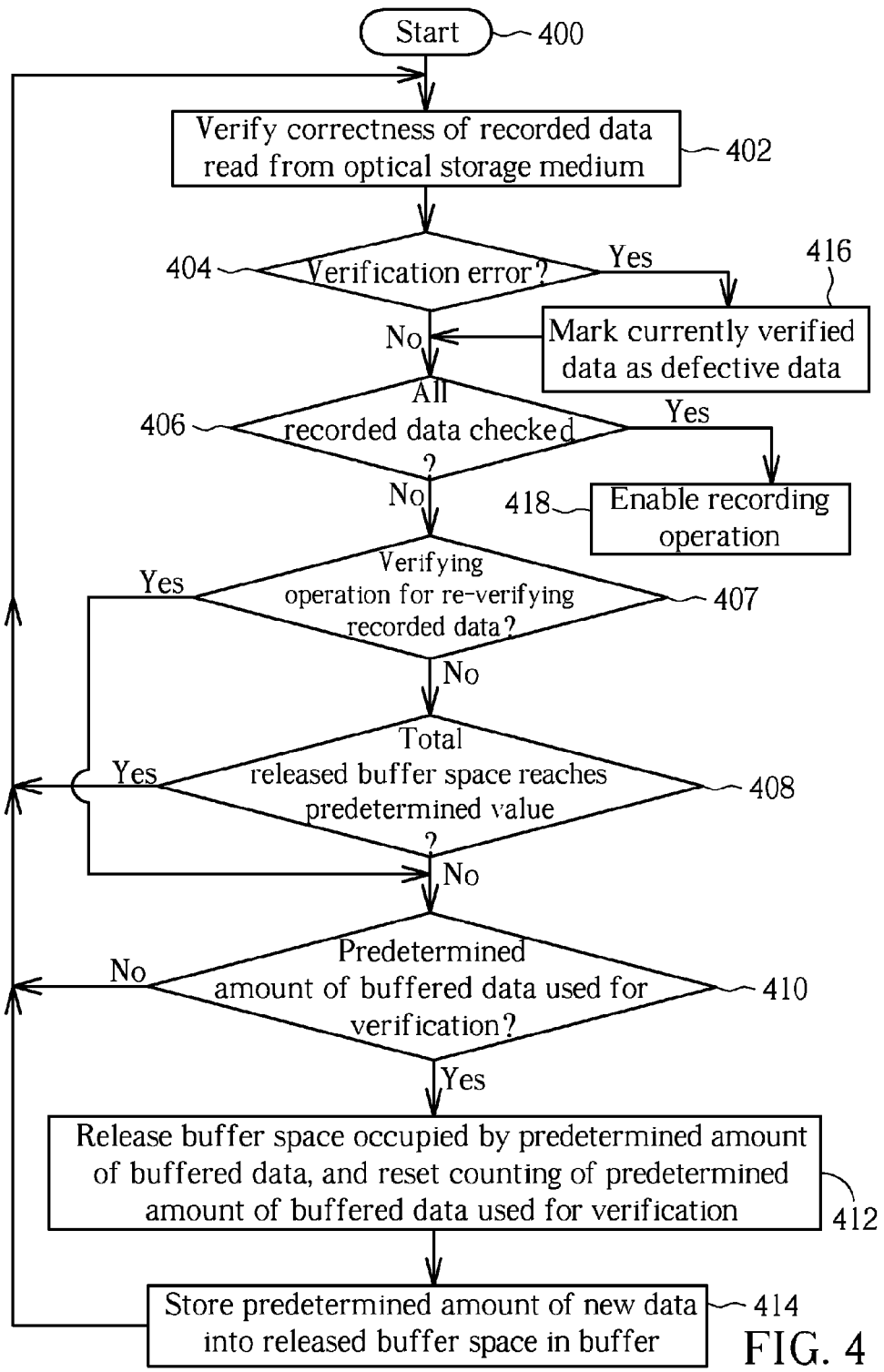
FIG. 4 is a flowchart illustrating an exemplary method of verifying recorded data on an optical storage medium according to the present invention.

FIG. 4 is a flowchart illustrating an exemplary method of verifying recorded data on an optical storage medium according to the present invention. Provided that the result is substantially the same, the steps are not required to be executed in the exact order shown in FIG. 4. The exemplary method may be employed by the data recording apparatus 204 shown in FIG. 2, and includes the following steps:

Step 400: Start a current verifying operation upon recorded data on the optical storage medium 201 according to a verification start point.

Step 402: The verifying circuit 214 receives the recorded data from the reading circuit 203 (which controls the optical pick-up head 202 to read the recorded data on the optical storage medium 201), and verifies the correctness of the recorded data read from the optical storage medium 201.

Step 404: The verifying circuit 214 checks if a verification error of currently verified data (e.g., a recorded ECC block or cluster) among the recorded data read from the optical storage medium 201 occurs. If yes, the flow goes to step 416; otherwise, the flow goes to step 406.

Step 406: The verifying circuit 214 checks if all of the recorded data to be verified in the current recording operation have been checked. If yes, the flow goes to step 418; otherwise, the flow goes to step 407.

Step 407: Is the verifying operation for re-verifying recorded data on the optical storage medium 201? If yes, the flow goes to step 410; otherwise, the flow goes to step 408.

Step 408: The buffer controller 216 checks if the total size of released buffer space reaches a predetermined value. If yes, the flow goes to step 402; otherwise, the flow goes to step 410.

Step 410: The buffer controller 216 checks if a predetermined amount of buffered data (e.g., two ECC blocks or clusters) buffered in the buffer 218 has been used for verifying the correctness of the recorded data on the optical storage medium 201. If yes, the flow goes to step 412; otherwise, the flow goes to step 402.

Step 412: The buffer controller 216 controls the buffer 218 to release a buffer space occupied by the predetermined amount of buffered data, and resets the counting of a predetermined amount of buffered data.

Step 414: The buffer controller 216 receives a predetermined amount of new data to be recorded onto the optical storage medium 201 in the next recording operation, and stores the predetermined amount of new data into the released buffer space of the buffer 218. The flow proceeds with step 402.

Step 416: The verifying circuit 214 marks the currently verified data (e.g., a recorded ECC block or cluster) as defective data. The flow proceeds with step 406.

Step 418: The recording circuit 210 is enabled to perform a recording operation for recording non-recorded data buffered in the buffer 218 onto the optical storage medium 201.

It should be noted that when step 318 in FIG. 3 is executed, the recording operation is changed to the verifying operation starting from step 400 in FIG. 4, and when step 418 in FIG. 4 is executed, the verifying operation is changed to the recording operation starting from step 300 in FIG. 3.

To more clearly describe features of the steps in the flowcharts shown in FIG. 3 and FIG. 4, different operational scenarios of the data recording apparatus 204 will be discussed as follows.

Assume that the data units for data storage on the optical storage medium 201 are ECC blocks, the number of ECC blocks recorded onto the optical storage medium 201 in one recording operation performed by the recording circuit 210 is equal to M, and the predetermined value mentioned in step 408 is S, which means that the buffer controller 216 will check if a buffer space capable of accommodating S ECC blocks has been released. More specifically, M represents a main buffer size for recording data, and S represents a leading ECC block number from a current recording position, say, the first one ECC block to be recorded when the current recording operation begins. Therefore, the aforementioned second data to be recorded in the previous recording operation include ECC blocks (N−M), . . . , (N−1), the aforementioned first data to be recorded in the current recording operation include ECC blocks N, . . . , (N+M+1), the portion of the first data mentioned above includes ECC blocks N, . . . , (N+S), and the remaining portion of the second data mentioned above includes ECC blocks (N−M+S+1), . . . , (N−1).

In this exemplary embodiment, the buffer size of the buffer 218 can be identical to that of a buffer used in the conventional storage apparatus. Therefore, a re-verifying mechanism can be realized without increasing the buffer cost. In addition, the value of S can be adjusted according to design consideration. For example, the recording circuit 210 encodes the buffered data in the buffer 218 to generate encoded data and then controls the optical pick-up head 202 to record the encoded data onto the optical storage medium 201. Therefore, the encoding capability of the recording circuit 210 is taken into consideration to set the value of S. In other words, as the buffer 218 only have part of the first data (e.g., S ECC blocks) stored therein when the current recording operation begins, the S ECC blocks have to provide sufficient data for allowing the recording circuit 210 to work smoothly. Briefly summarized, the value of S should be properly set to avoid jeopardizing the overall recording performance of the optical storage apparatus 200.

Figure 5:
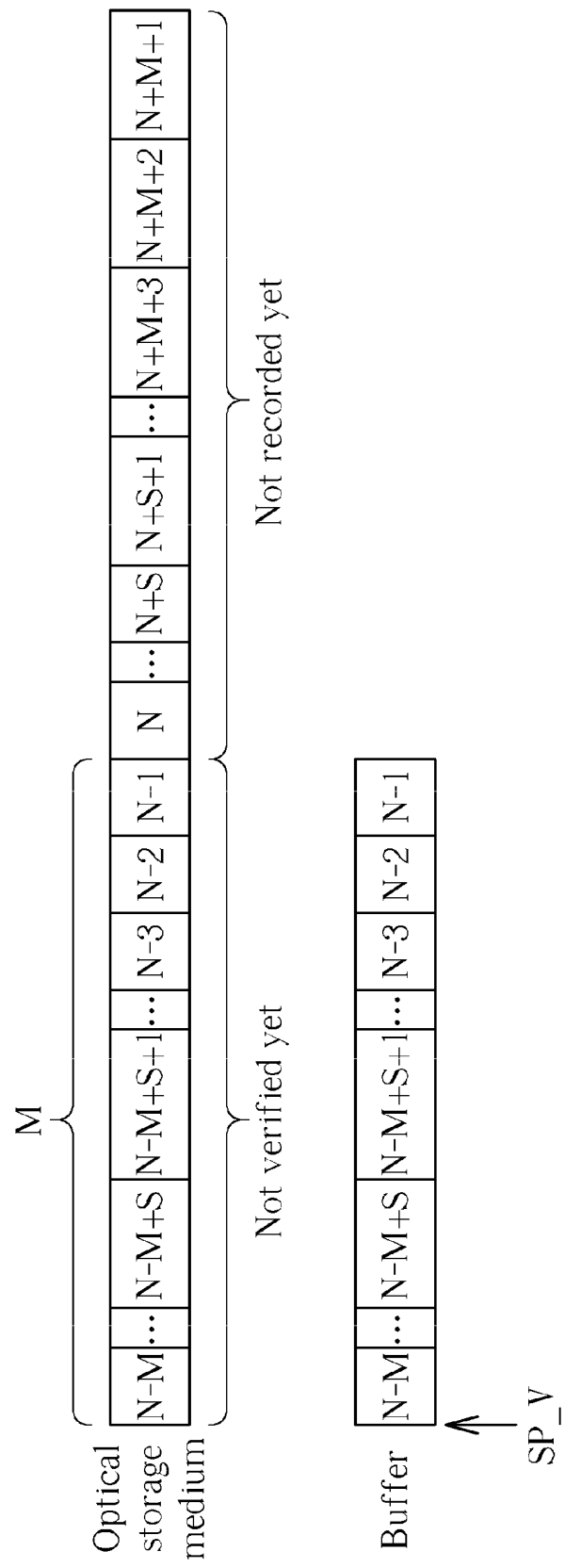
FIG. 5 is a diagram showing a first exemplary data storage status of an optical storage medium and a buffer shown in FIG. 2.

Assume that no fatal recording error is detected when the second data (i.e., ECC blocks (N−M), . . . , (N−1)) are recorded onto the optical storage medium 201 during the previous recording operation. Therefore, when all of the buffered ECC blocks (N−M), . . . , (N−1) in the buffer 218 have been recorded onto the optical storage medium 201, the verification start point SP_V will be set to the beginning of the ECC block (N−M) buffered in the buffer 218 (steps 306 and 318), as shown in FIG. 5. It should be noted that the verification start point SP_V is a default verification start point without any modification applied thereto. In step 400, the verifying circuit 214 starts the present verifying operation according to the verification start point SP_V. In step 402, the recorded ECC block (N−M) read from the optical storage medium 201 is compared with the buffered ECC block (N−M) in the buffer 218 to verify the correctness of the recorded ECC block (N−M). In step 404, a verification error will be detected if a mismatch between the recorded ECC block (N−M) and the buffered ECC block (N−M) is found; otherwise, the recorded ECC block (N−M) is regarded as an error-free recorded ECC block. As all of the recorded ECC blocks (N−M), . . . , (N−1) are not verified yet and the verifying operation is not used for re-verifying recorded data, the buffer controller 216 checks if the buffer 218 has released an overall buffer space capable of storing S ECC blocks (steps 406, 407 and 408). As no buffer space is released yet, the buffer controller 216 checks if two buffered ECC blocks have been used to verify the correctness of respective recorded ECC blocks on the optical storage medium 201 (step 410). Due to the fact that only one buffered ECC block (N−M) has been used to verify the correctness of the recorded ECC block (N−M), the verifying circuit 214 continues verifying the correctness of the next recorded ECC block (N−M+1) on the optical storage medium 201.

Figure 6:
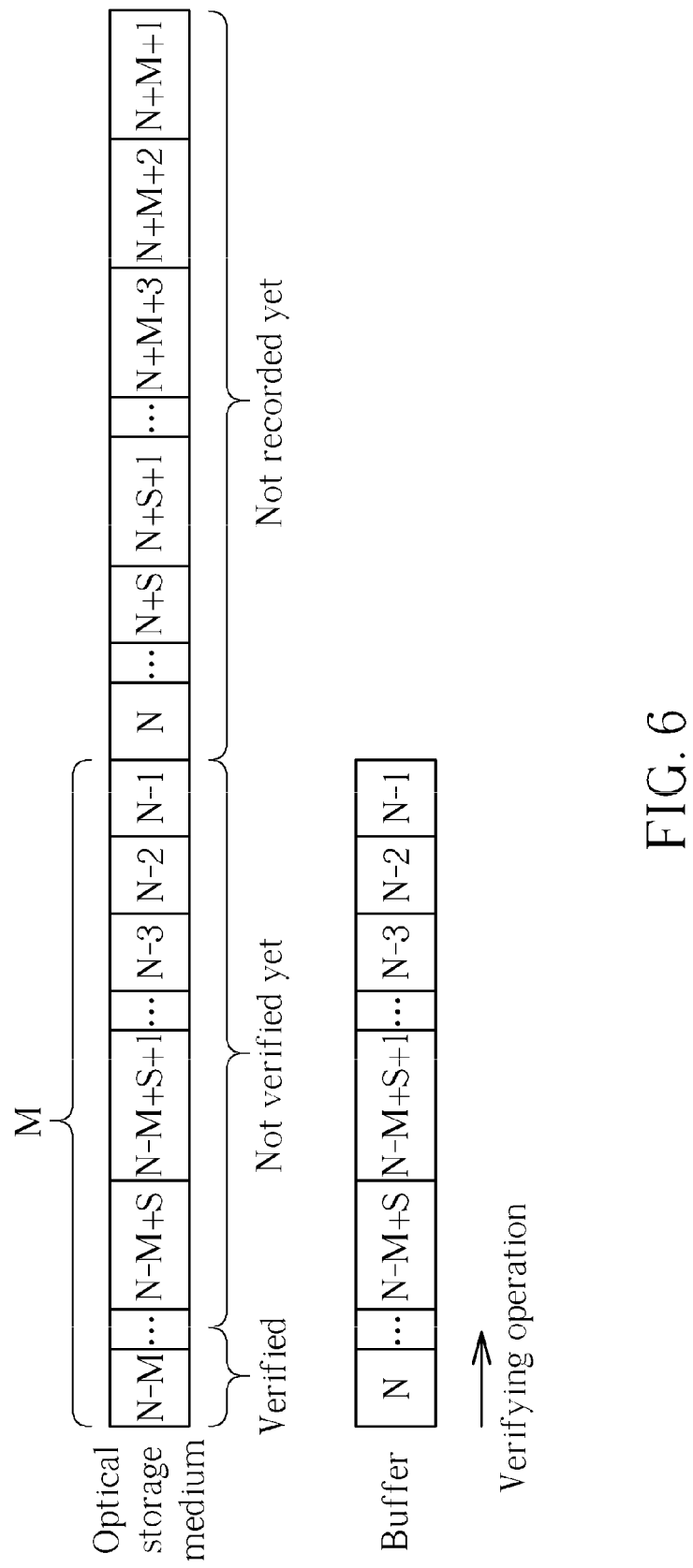
FIG. 6 is a diagram showing a second exemplary data storage status of an optical storage medium and a buffer shown in FIG. 2.

Similarly, in step 402, the recorded ECC block (N−M+1) read from the optical storage medium 201 is compared with the buffered ECC block (N−M+1) to verify the correctness of the recorded ECC block (N−M+1). In step 404, a verification error will be detected if a mismatch between the recorded ECC block (N−M+1) and the buffered ECC block (N−M+1) is found; otherwise, the recorded ECC block (N−M+1) is regarded as an error-free recorded ECC block. As all of the recorded ECC blocks (N−M), . . . , (N−1) are not verified yet, the verifying operation is not used for re-verifying recorded data, and the buffer 218 does not release an overall buffer space capable of storing S ECC blocks yet, the buffer controller 216 checks if two buffered ECC blocks have been used to verify the correctness of respective recorded ECC blocks on the optical storage medium 201 (steps 406, 407, 408 and 410). As two buffered ECC blocks (N−M) and (N−M+1) have been used to verify the correctness of the recorded ECC blocks (N−M) and (N−M+1), the buffer controller 216 therefore controls the buffer 218 to release a buffer space occupied by the buffered ECC block (N−M), and stores an ECC block N to be recorded onto the optical storage medium 201 in the next recording operation into the buffer 218, thereby overwriting the buffered ECC block (N−M) (steps 412 and 414), as shown in FIG. 6. In addition, the count number of the buffered ECC blocks which have been used to verify the correctness of the recorded ECC blocks will be reset to an initial value (e.g., 0), and predetermined amount of buffered data can be reset thereby (step 412).

Figure 7:
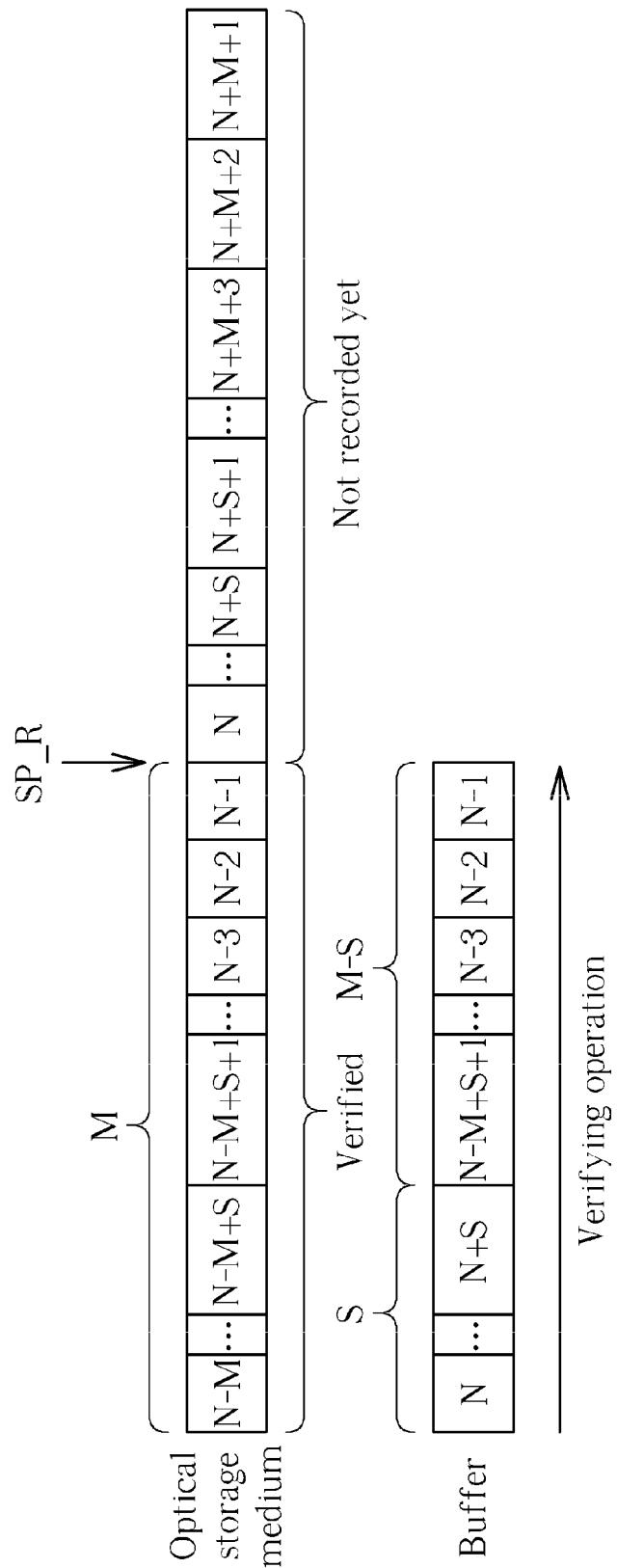
FIG. 7 is a diagram showing a third exemplary data storage status of an optical storage medium and a buffer shown in FIG. 2.

The above-mentioned verifying operation is repeated for verifying the correctness of each of the following recorded ECC blocks (N−M+2), . . . , (N−1), as shown in FIG. 7. It should be noted that after the buffered ECC block (N−M+S) in the buffer 218 is overwritten by the ECC block (N+S) to be recorded in the next recording operation, no new data are allowed to be stored into the buffer 218 (step 408). As a result, a portion of second data, such as ECC blocks (N−M), . . . , (N−M+S), buffered in the buffer 218 is replaced with a portion of the first data, such as ECC blocks N, . . . , (N+S). Thus, the buffer 218 has a remaining portion of the second data, such as ECC blocks (N−M+S+1), . . . , (N−1), and the portion of the first data, such as ECC blocks N, . . . , (N+S), buffered therein in the beginning of the current recording operation.

After all of the recorded ECC blocks (N−M), . . . , (N−1) have been verified by the previous verifying operation, the recording circuit 210 is enabled to perform the current recording operation (steps 406 and 418). As shown in FIG. 7, the recording start point SP_R of the current recording operation immediately follows the end of the recorded ECC block (N−1). In step 300, the recording circuit 210 starts the current recording operation according to the recording start point SP_R. In step 302, the recording circuit 210 reads the buffered ECC block N from the buffer 218 and records the ECC block N onto the optical storage medium 201. In step 304, the detecting circuit 212 checks if a fatal recording error occurs. Assume that no fatal recording error occurs during the current recording operation. Therefore, there is no need to re-verify the recorded data which have been verified in the previous verifying operation. As all of the buffered ECC blocks N, . . . , (N+M+1) are not recorded onto the optical storage medium 201 yet, the buffer controller 216 checks if all of the data to be recorded during the current recording operation have been buffered in the buffer 218 (steps 306 and 308). Since only a portion of the first data, such as ECC blocks N, . . . , (N+S), is buffered in the buffer 218 now, the buffer controller 216 further checks if two buffered ECC blocks have been recorded onto the optical storage medium 201 (step 310). Due to the fact that only one buffered ECC block N has been recorded, the recording circuit 210 therefore continues recording the next buffered ECC block (N+1) onto the optical storage medium 201.

Figure 8:
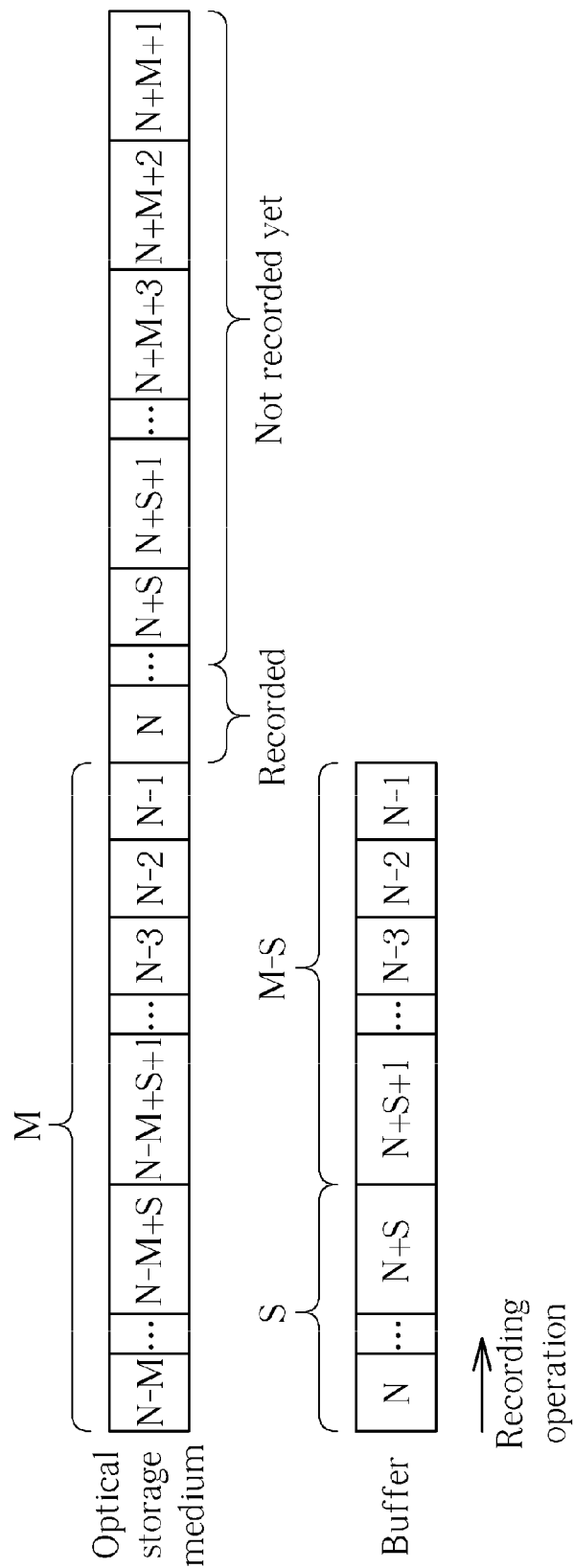
FIG. 8 is a diagram showing a fourth exemplary data storage status of an optical storage medium and a buffer shown in FIG. 2.

Similarly, in step 302, the recording circuit 210 reads the buffered ECC block (N+1) from the buffer 218 and records the ECC block (N+1) onto the optical storage medium 201. As no fatal recording error is detected by the detecting circuit 212 and all of the ECC blocks N, . . . , (N+M+1) are not recorded onto the optical storage medium 201 yet, the buffer controller 216 checks if all of the data to be recorded during the current recording operation have been buffered in the buffer 218 (steps 304, 306 and 308). As only a portion of the first data is buffered in the buffer 218 now and two buffered ECC blocks N and (N+1) have been recorded onto the optical storage medium 201, the buffer controller 216 controls the buffer 218 to release a buffer space occupied by the buffered ECC block (N−M+S+1) belonging to the second data used in the previous recording operation, and stores an ECC block (N+S+1) to be recorded onto the optical storage medium 201 in the current recording operation into the buffer 218, thereby overwriting the buffered ECC block (N−M+S+1) (steps 412 and 414), as shown in FIG. 8. In addition, the count number of the buffered ECC blocks which have been recorded onto the optical storage medium 201 will be reset to an initial value (e.g., 0), and predetermined amount of buffered data can be reset thereby (step 412).

Figure 9:
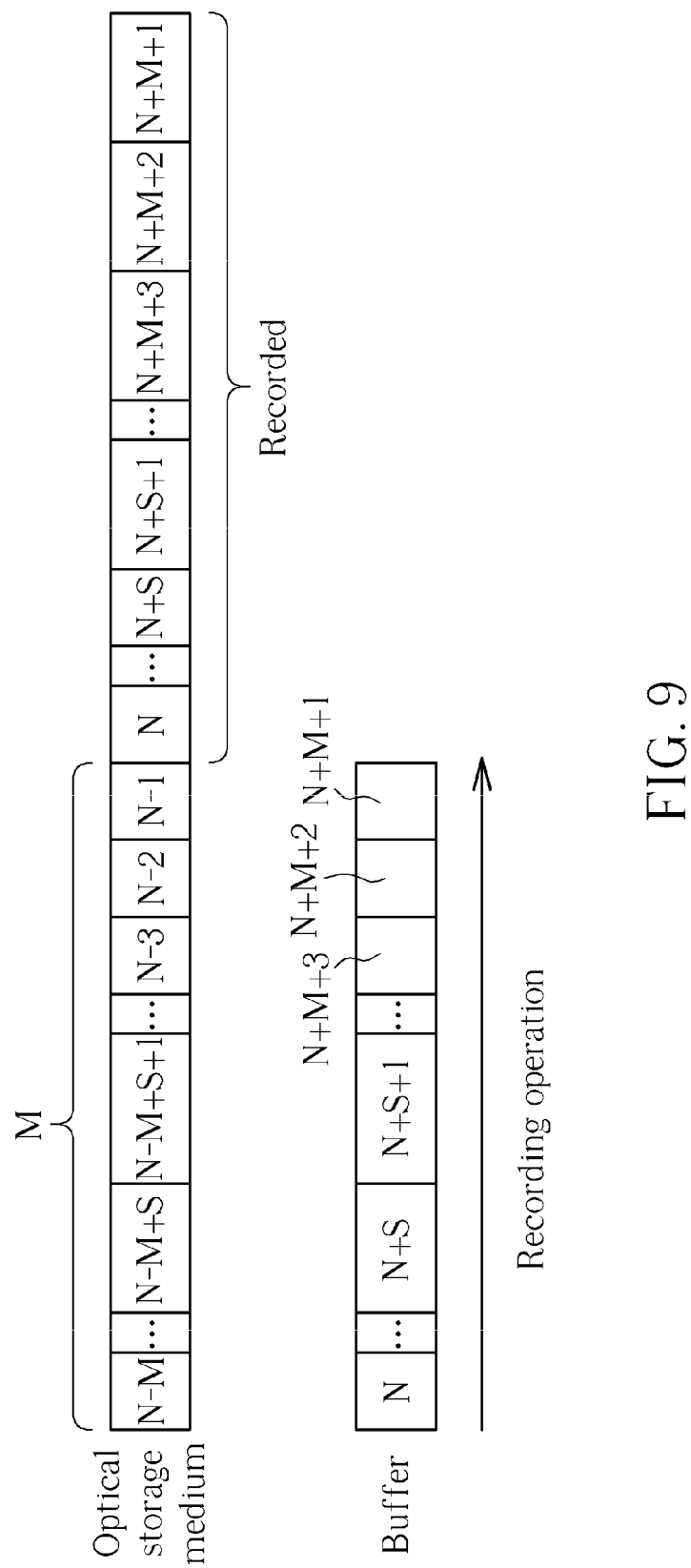
FIG. 9 is a diagram showing a fifth exemplary data storage status of an optical storage medium and a buffer shown in FIG. 2.

The above recording operation is repeated for recording each of the following buffered ECC blocks (N+2), . . . , (N+M+1), as shown in FIG. 9. It should be noted that the remaining portion of the second data, such as ECC blocks (N−M+S+1), . . . , (N−1), will be finally replaced by the remaining portion of the first data, such as replaced by ECC blocks (N+S+1), . . . , (N+M+1). In addition, after the ECC block (N−1) is overwritten by the ECC block (N+M+1), no new data are allowed to be stored into the buffer 218 (step 308).

Figure 10:
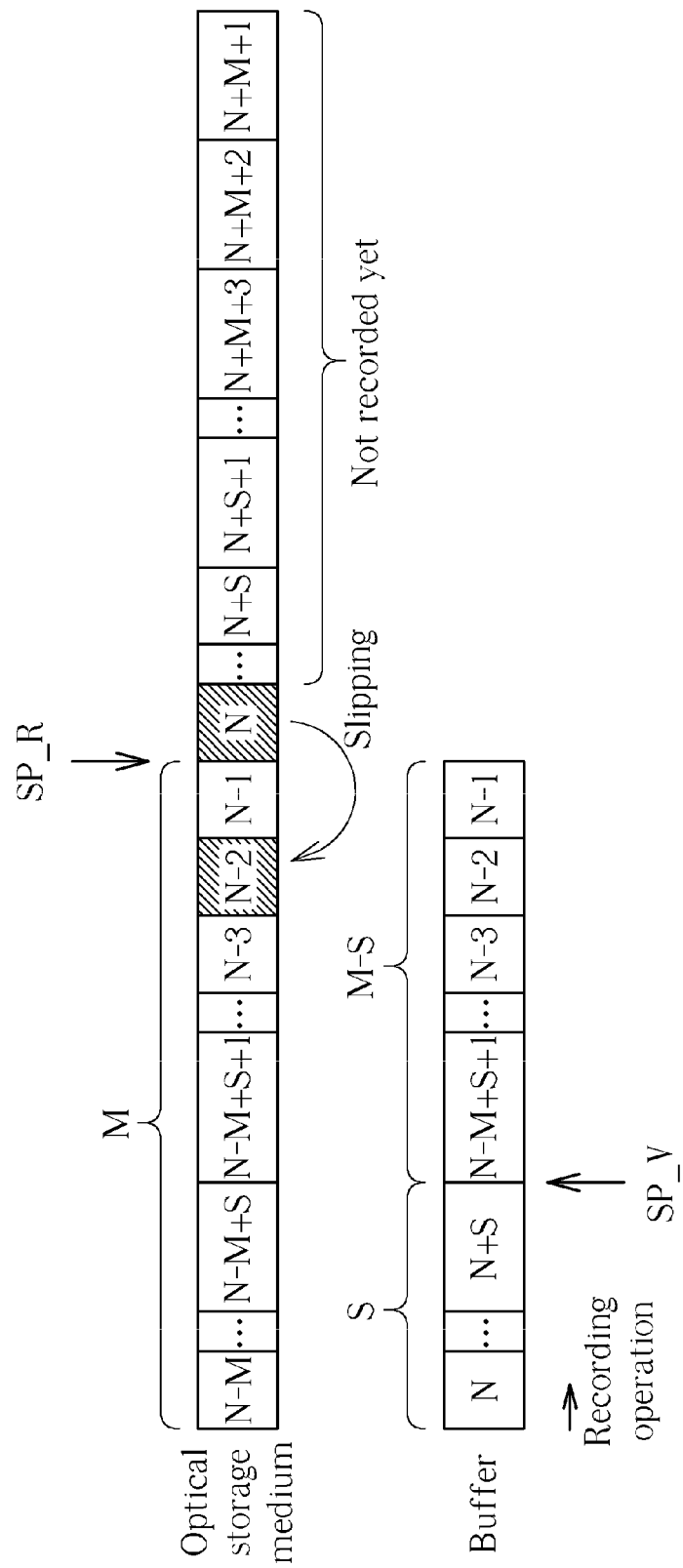
FIG. 10 is a diagram showing a sixth exemplary data storage status of an optical storage medium and a buffer shown in FIG. 2.

Consider another case where a fatal error does occur during the current recording operation. As shown in FIG. 10, after all of the recorded ECC blocks (N−M), . . . , (N−1) have been verified by the previous verifying operation, the recording circuit 210 is enabled to perform the current recording operation (steps 406 and 418). As mentioned above, the recording start point SP_R of the current recording operation immediately follows the end of the recorded ECC block (N−1). The recording circuit 210 therefore starts recording the buffered ECC block N read from the buffer 218 onto the optical storage medium 201 (steps 300 and 302). However, due to the power transient and/or servo condition variation occurring in the beginning of the current recording operation, the optical pick-up head 202 slips from a current recording position to an erroneous address on the optical storage medium 201. As shown in FIG. 10, the optical pick-up head 202 moves to the position where the recorded ECC block (N−2) is stored, and the data content of the recorded ECC block (N−2) may be damaged due to the laser beam emitted by the optical pick-up head 202. Such a fatal recording error is detected by the detecting circuit 212, and the verification start point SP_V is modified to the beginning of the remaining portion of the second data in the buffer 218 (steps 304 and 316). Next, the verifying circuit 214 is enabled to start a current verifying operation used for re-verifying the recorded data (step 318).

In step 400, the verifying circuit 214 starts the current verifying operation according to the modified verification start point SP_V which is now located at the beginning of the buffered ECC block (N−M+S+1), as shown in FIG. 10. In step 402, the recorded ECC block (N−M+S+1) read from the optical storage medium 201 is compared with the buffered ECC block (N−M+S+1) in the buffer 218 to verify the correctness of the recorded ECC block (N−M+S+1). In step 404, a verification error will be detected if a mismatch between the recorded ECC block (N−M+S+1) and the buffered ECC block (N−M+S+1) is found; otherwise, the recorded ECC block (N−M+S+1) is still regarded as an error-free recorded ECC block. As all of the recorded ECC blocks (N−M+S+1), . . . , (N−1) are not verified yet and the verifying operation is used for re-verifying recorded data, the buffer controller 216 checks if two buffered ECC blocks have been used to verify the correctness of respective recorded ECC blocks on the optical storage medium 201 (steps 406, 407 and 410). As only one buffered ECC block (N−M+S+1) has been used to verify the correctness of the recorded ECC block (N−M+S+1), the verifying circuit 214 continues verifying the correctness of the next recorded ECC block (N−M+S+2).

Figure 11:
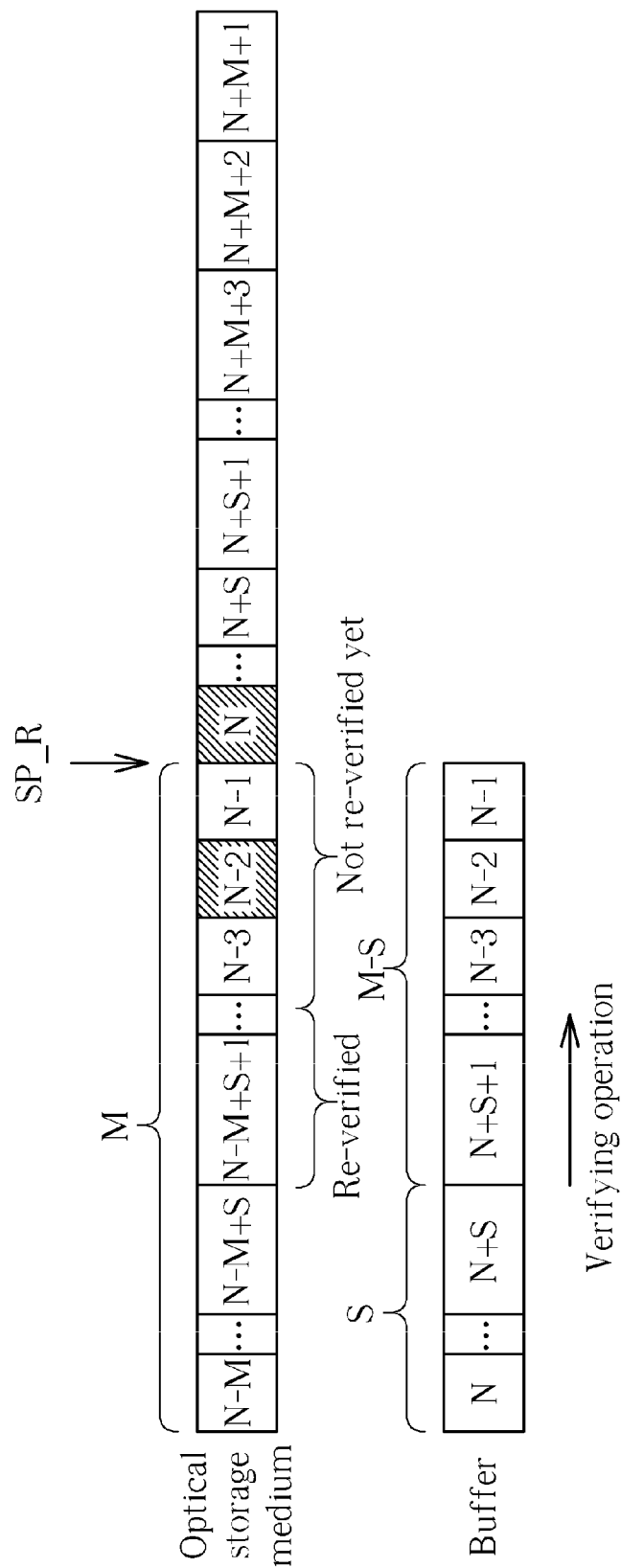
FIG. 11 is a diagram showing a seventh exemplary data storage status of an optical storage medium and a buffer shown in FIG. 2.

Similarly, in step 402, the recorded ECC block (N−M+S+2) read from the optical storage medium 201 is compared with the ECC block (N−M+S+2) buffered in the buffer 218 to verify the correctness of the recorded ECC block (N−M+S+2). In step 404, a verification error will be detected if a mismatch between the recorded ECC block (N−M+S+2) and the buffered ECC block (N−M+S+2) is found; otherwise, the recorded ECC block (N−M+S+2) is still regarded as an error-free recorded ECC block. As all of the recorded ECC blocks (N−M+S+1), . . . , (N−1) are not verified yet, the verifying operation is used for re-verifying recorded data, and two buffered ECC blocks (N−M+S+1) and (N−M+S+2) have been used to verify the correctness of the recorded ECC blocks (N−M+S+1) and (N−M+S+2), the buffer controller 216 controls the buffer 218 to release a buffer space occupied by the buffered ECC block (N−M+S+1), and stores an ECC block (N+S+1) to be recorded onto the optical storage medium 201 in the current recording operation into the buffer 218, thereby overwriting the buffered ECC block (N−M+S+1) (steps 406, 407, 410, 412 and 414), as shown in FIG. 11. In addition, the count number of the buffered ECC blocks which have been used to verify the correctness of the recorded ECC blocks will be reset to an initial value (e.g., 0), and predetermined amount of buffered data can be reset thereby (step 412). The above verifying operation is repeated for verifying the correctness of each of the following recorded ECC blocks (N−M+S+3), . . . , (N−1). Further description is omitted here for brevity.

In above exemplary operational scenarios, each data unit to be buffered, verified, or recorded is one ECC block. However, this is for illustrative purposes only. The size of the data unit is adjustable according to design consideration. For example, in an alternative design, the data unit is not an integer multiple of an ECC block. In addition, the definition of the data unit may vary for different types of the optical storage medium 201. In one case where the optical storage medium 201 is a digital versatile disc (DVD), the definition of the data unit is based on ECC block(s). In another case where the optical storage medium 201 is a Blu-ray disc (BD), the definition of the data unit is based on cluster(s).

Moreover, the verifying speed is preferably half of the recording speed for optimum recording performance. In view of this, a storage space of two data units (e.g., two ECC blocks or clusters) in the buffer 218 may be released each time one data unit (e.g., one ECC block or cluster) is verified or recorded. However, this is for illustrative purposes only. Other alternative designs are feasible.

To put it simply, the remaining portion of the second data buffered in the buffer 218, as shown in FIG. 7 and FIG. 10, defines a protected range for the corresponding recorded data on the optical storage medium 201. The protected range may be expressed in terms of data units (e.g., ECC blocks or clusters): N−(N−M+S)=M−S. Taking a DVDRAM disc drive with a 2 MB buffer for example, M is equal to 1C0h (i.e., 14 ECC blocks), S is equal to 20h (i.e., 2 ECC blocks), and the protected range is equal to 1A0h (i.e., 5 outer tracks or 10 inner tracks). Taking a BD drive with a 2 MB buffer for example, M is equal to 180h (i.e., 12 clusters), S is equal to 40h (i.e., 2 clusters), and the protected range is equal to 140h (i.e., 2 outer tracks or 4 inner tracks).

Figure 12:
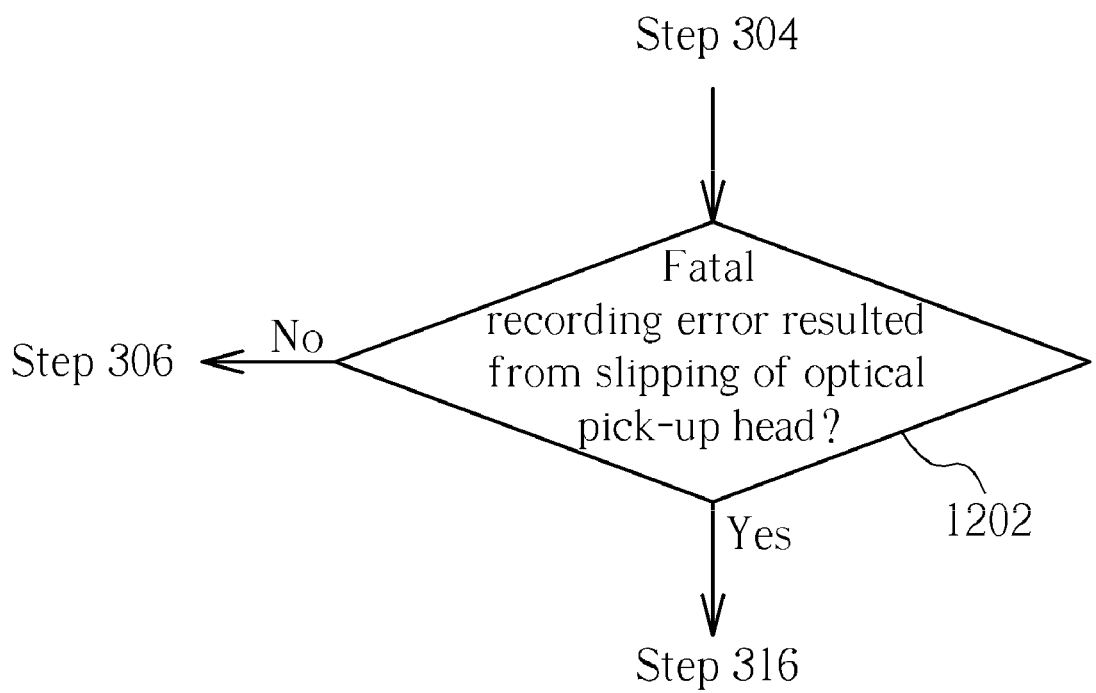
FIG. 12 is a flowchart showing an addition step which can be added to the exemplary flow shown in FIG. 3.

As shown in FIG. 3, the verifying operation for re-verifying recorded data is executed each time the detecting circuit 212 detects a fatal recording error (steps 304, 316 and 318). However, it is possible that the cause of the fatal recording error is not the slipping optical pick-up head 202. For example, the stationary defects on the optical storage medium 201 may result in a fatal recording error during the recording operation; however, the recorded data which have been verified may not be affected by such a fatal recording error. Therefore, the flowchart shown in FIG. 3 can be modified to have an additional step 1202 inserted between steps 304 and step 316, as shown in FIG. 12. In step 1202, the detecting circuit 212 further checks if the fatal recording error is resulted from the optical pick-up head 202 slipping to an erroneous address on the optical storage medium 201. If yes, the flow goes to step 316; otherwise, the flow goes to step 306 without activating a verifying operation to re-verify recorded data in response to the detected fatal recording error.

Figure 13:
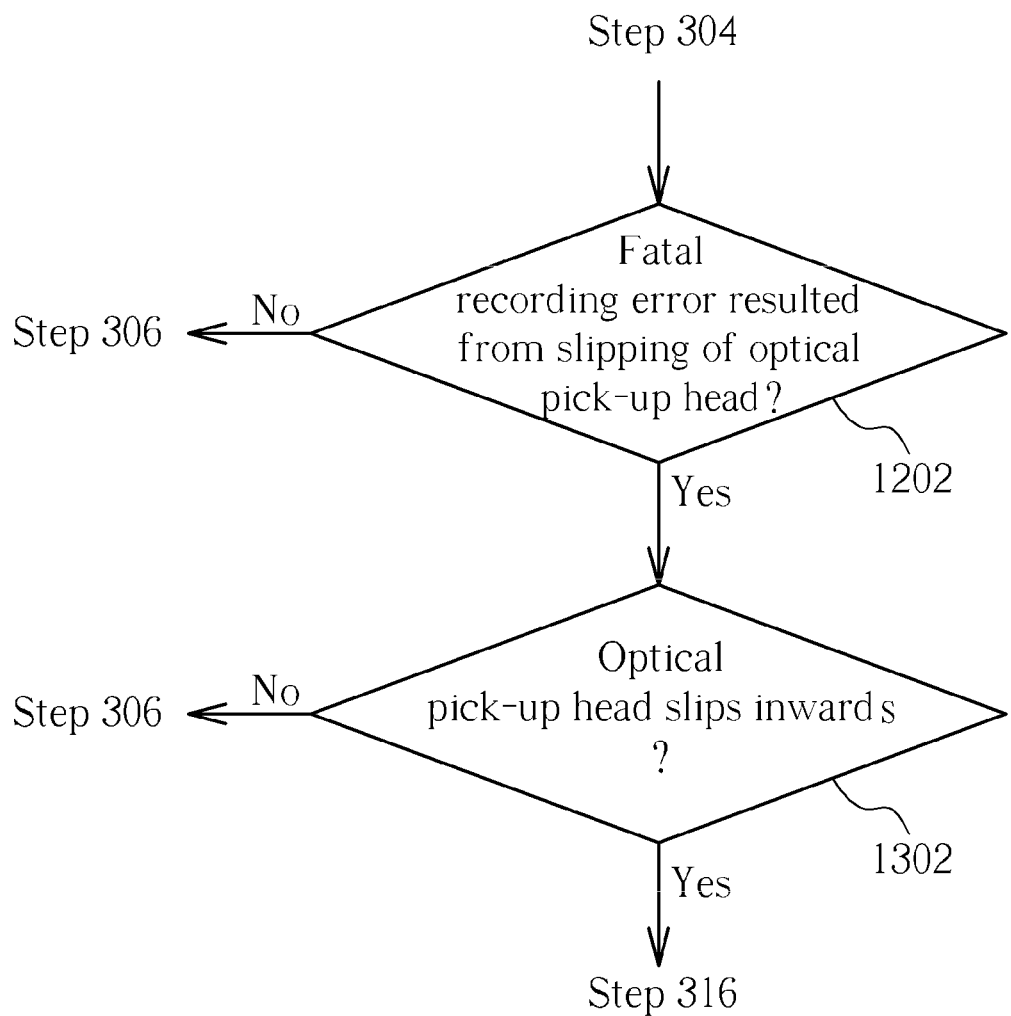
FIG. 13 is a flowchart showing a plurality of addition steps which can be added to the exemplary flow shown in FIG. 3.

Moreover, when the optical pick-up head 202 moves from an inner track to an outer track in a radial direction of the optical storage medium 201 for recording data onto the optical storage medium 201, the optical pick-up head 202 slipping outwards to an erroneous address where no data are recorded does not damage recorded data which have been verified. Therefore, the flowchart shown in FIG. 3 can be modified to have two additional steps 1202 and 1302 inserted between steps 304 and step 316, as shown in FIG. 13. In step 1302, the detecting circuit 212 further checks if the optical pick-up head 202 slips inwards to an erroneous address where recorded data are located. If yes, the flow goes to step 316; otherwise, the flow goes to step 306 without activating a verifying operation to re-verify recorded data in response to the detected fatal recording error.

By way of example, but not limitation, detecting whether the fatal recording error is caused by the slipping optical pick-up head can be simply realized by checking addresses of the optical storage medium. In a case where addresses of successive data units recorded by the optical pick-up head are not continuous or a current address on the optical storage medium is not identical to an expected address, it can be judged that the optical pick-up head slips to an erroneous address. Similarly, detecting whether the optical pick-up head slips inwards to an erroneous address can also be realized by checking addresses of the optical storage medium. However, this is for illustrative purposes only. Any means capable of judging whether the fatal recording error is caused by the slipping optical pick-up head or judging whether the optical pick-up head slips inwards to an erroneous address can be employed by the detecting circuit 212.

The fatal recording error may be caused by an external force applied to the optical storage apparatus 200 in a radial direction of the optical storage medium such that a tracking error signal will indicate that the optical pick-up head does slip to an erroneous address of the optical storage medium. However, with the help of the re-verifying mechanism mentioned above, readout data derived from reading recorded data on the optical storage medium are error-free after a recording procedure of the optical storage medium is accomplished, where the recording procedure may have a plurality of recording operations and a plurality of verifying operation involved therein.

Those skilled in the art will readily observe that numerous modifications and alterations of the device and method may be made while retaining the teachings of the invention.

What is claimed is:

1. A data recording method of an optical storage medium, comprising:
   during a current recording operation for recording first data onto the optical storage medium, detecting if a fatal recording error occurs; and
   when the fatal recording error is detected, activating a current verifying operation to verify correctness of a recorded data section on the optical storage medium, wherein the recorded data section was recorded onto the optical storage medium according to second data during a previous recording operation, and data recording of the second data has been verified during a previous verifying operation prior to the current recording operation.

2. The data recording method of claim 1, further comprising:
   referring to the second data buffered in a buffer to record the second data onto the optical storage medium during the previous recording operation; and
   receiving a portion of the first data and replacing a portion of the second data buffered in the buffer with the portion of the first data;
   wherein the buffer has a remaining portion of the second data and the portion of the first data buffered therein in a beginning of the current recording operation.

3. The data recording method of claim 2, wherein activating the current verifying operation to verify correctness of the recorded data section on the optical storage medium comprises:
   referring to at least part of the remaining portion of the second data available in the buffer to verify correctness of the recorded data section on the optical storage medium.

4. The data recording method of claim 2, wherein receiving the portion of the first data and replacing the portion of the second data buffered in the buffer with the portion of the first data comprises:
   during the previous verifying operation, releasing a buffer space occupied by the portion of the second data, receiving the portion of the first data, and storing the portion of the first data into the released buffer space of the buffer.

5. The data recording method of claim 2, further comprising:
   during the current verifying operation, releasing a buffer space occupied by at least part of the remaining portion of the second data available in the buffer, receiving another portion of the first data, and storing the another portion of the first data into the released buffer space of the buffer.

6. The data recording method of claim 2, further comprising:
   during the current recording operation, releasing at least part of the remaining portion of the second data available in the buffer, receiving another portion of the first data, and storing the another portion of the first data into the released buffer space of the buffer.

7. The data recording method of claim 1, wherein activating the current verifying operation to verify correctness of the recorded data section on the optical storage medium comprises:
   checking if the fatal recording error is caused by an optical pick-up head slipping to an erroneous address of the optical storage medium; and
   activating the current verifying operation when the fatal recording error is caused by the optical pick-up head slipping to the erroneous address of the optical storage medium.

8. The data recording method of claim 1, wherein activating the current verifying operation to verify correctness of the recorded data section on the optical storage medium comprises:
   checking if the fatal recording error is caused by an optical pick-up head slipping inwards to an erroneous address of the optical storage medium in a radial direction of the optical storage medium; and
   activating the current verifying operation when the fatal recording error is caused by the optical pick-up head slipping inwards to the erroneous address of the optical storage medium.

9. The data recording method of claim 1, wherein the fatal recording error is caused by an external force applied in a radial direction of the optical storage medium such that an optical pick-up head slips to an erroneous address of the optical storage medium, and after a recording procedure of the optical storage medium is accomplished, readout data derived from reading recorded data on the optical storage medium are error-free.

10. A data recording apparatus of an optical storage medium, comprising:
    a recording circuit, configured for recording data onto the optical storage medium;
    a detecting circuit, configured for detecting if a fatal recording error occurs during a current recording operation performed by the recording circuit to record first data onto the optical storage medium; and
    a verifying circuit, coupled to the detecting circuit, for performing a current verifying operation to verify correctness of a recorded data section on the optical storage medium when the fatal recording error is detected by the detecting circuit;
    wherein the recorded data section was recorded onto the optical storage medium according to second data during a previous recording operation performed by the recording circuit, and data recording of the second data has been verified during a previous verifying operation performed by the verifying circuit prior to the current recording operation performed by the recording circuit.

11. The data recording apparatus of claim 10, further comprising:
    a buffer controller; and
    a buffer, coupled to the recording circuit, the verifying circuit, and the buffer controller;
    wherein the recording circuit refers to the second data buffered in the buffer to record the second data onto the optical storage medium during the previous recording operation; and the buffer controller receives a portion of the first data and replaces a portion of the second data buffered in the buffer with the portion of the first data, where the buffer has a remaining portion of the second data and the portion of the first data buffered therein in a beginning of the current recording operation performed by the recording circuit.

12. The data recording apparatus of claim 11, wherein the verifying circuit refers to at least part of the remaining portion of the second data available in the buffer to verify correctness of the recorded data section on the optical storage medium.

13. The data recording apparatus of claim 11, wherein during the previous verifying operation performed by the verifying circuit, the buffer controller releases a buffer space occupied by the portion of the second data, receives the portion of the first data, and stores the portion of the first data into the released buffer space of the buffer.

14. The data recording apparatus of claim 11, wherein during the current verifying operation performed by the verifying circuit, the buffer controller releases a buffer space occupied by at least part of the remaining portion of the second data available in the buffer, receives another portion of the first data, and stores the another portion of the first data into the released buffer space of the buffer.

15. The data recording apparatus of claim 11, wherein during the current recording operation performed by the recording circuit, the buffer controller releases at least part of the remaining portion of the second data available in the buffer, receives another portion of the first data, and stores the another portion of the first data into the released buffer space of the buffer.

16. The data recording apparatus of claim 10, wherein the detecting circuit further checks if the fatal recording error is caused by an optical pick-up head slipping to an erroneous address of the optical storage medium; and the verifying circuit activates the current verifying operation when the fatal recording error is caused by the optical pick-up head slipping to the erroneous address of the optical storage medium.

17. The data recording apparatus of claim 10, wherein the detecting circuit further checks if the fatal recording error is caused by an optical pick-up head slipping inwards to an erroneous address of the optical storage medium in a radial direction of the optical storage medium; and the verifying circuit activates the current verifying operation when the fatal recording error is caused by the optical pick-up head slipping inwards to the erroneous address of the optical storage medium.

18. The data recording apparatus of claim 10, wherein the fatal recording error is caused by an external force applied in a radial direction of the optical storage medium such that an optical pick-up head slips to an erroneous address of the optical storage medium, and after a recording procedure of the optical storage medium is accomplished, readout data derived from reading recorded data on the optical storage medium are error-free.

* * * * *